Figure 1:
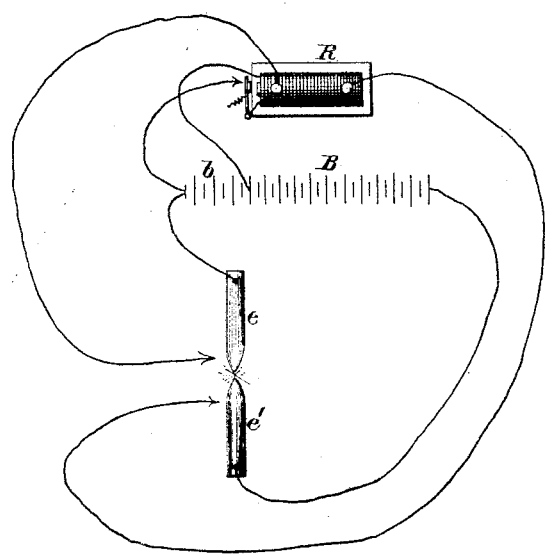

J. H. ROGERS.
Electric-Light.

No. 216,760. Patented June 24, 1879.

Attest:
J. H. Kaiser.
J. W. Rogers

Inventor:
J. Harris Rogers

UNITED STATES PATENT OFFICE.

JAMES HARRIS ROGERS, OF WASHINGTON, DISTRICT OF COLUMBIA.

IMPROVEMENT IN ELECTRIC LIGHTS.

Specification forming part of Letters Patent No. 216,760, dated June 24, 1879; application filed December 27, 1878.

*To all whom it may concern:*

Be it known that I, J. HARRIS ROGERS, of Washington city, in the District of Columbia, have invented a new and useful Improvement in the Electric Light, of which the following is a specification.

My invention consists in the combination of a Ruhmkorff coil or other electrical instrument giving a current of high tension with electrodes properly disposed for receiving the electric arc, and furnished with ordinary appliances to produce it.

The object of my invention is to establish the said arc without connecting, and then separating the electrodes or otherwise breaking the circuit after closing it to establish the arc, and also to re-establish the arc when extinguished, or about to be extinguished, so quickly that it will but seldom, if ever, go out, and doing this either automatically or by volition of an operator. The drawings herewith filed show how these results may be effected by suitable instruments and electric circuits, similar letters of reference indicating like parts.

Figure 1 represents one way in which I propose to use a Ruhmkorff coil or other instrument giving a current of high tension to establish the electric arc, and also to re-establish automatically as often as it may be partially extinguished or go out. In this figure, B is an electric battery or a dynamo-electric machine. $b$ is a section of the same. R is a Ruhmkorff coil or other instrument giving an electric current of high tension; $e$ and $e'$, electrodes. The line leading from poles of $b$ represent the conductors for a primary current acting on R. The lines leading from R and terminating in arrow-heads represent the conductors of secondary current from R, and the lines which connect the opposite poles of B represent the conductors leading to the two electrodes $e\ e'$.

The poles of $b$, being suitably connected with R, (R being suitably related by circuits aforesaid to $e\ e'$,) will, in sending its induced current through them, tear off the particles of $e$ or $e'$ sufficiently to form a conductor, aided by the rarefied or heated atmosphere, for the currents from B to pass and establish the electric arc, and will also re-establish the arc as required if it becomes partially extinguished or goes out.

It is manifestly in the same line of thought, though not so effective, to apply the Ruhmkorff coil or currents of high tension as above by volition instead of doing so automatically. It is also manifest that $b$ might be dispensed with as a section of B if another battery were suitably applied to R to effect what $b$ accomplishes herein.

Having thus described my invention, what I claim as new, and ask Letters Patent for, is—

The secondary current of a Ruhmkorff coil, with or without condenser, for establishing and re-establishing the electric arc or light when said arc or light proceeds from a dynamo-electric machine or voltaic battery, substantially as and for the purpose herein set forth and described.

JAS. HARRIS ROGERS.

Witnesses:
   D. P. LOWE,
   J. W. ROGERS.